F. W. PAWLING.
GLASS MOLDING MACHINE.
APPLICATION FILED MAR. 10, 1909.

949,880.

Patented Feb. 15, 1910.
4 SHEETS—SHEET 1.

FIG. 1

WITNESSES:

INVENTOR
Francis W. Pawling

ATTORNEY

F. W. PAWLING.
GLASS MOLDING MACHINE.
APPLICATION FILED MAR. 19, 1908.

949,880.

Patented Feb. 15, 1910.
4 SHEETS—SHEET 4.

WITNESSES

INVENTOR
Francis W. Pawling
BY
ATTORNEY

UNITED STATES PATENT OFFICE.

FRANCIS W. PAWLING, OF SALEM, NEW JERSEY.

GLASS-MOLDING MACHINE.

949,380.   Specification of Letters Patent.   Patented Feb. 15, 1910.

Application filed March 10, 1908. Serial No. 420,132.

*To all whom it may concern:*

Be it known that I, FRANCIS W. PAWLING, a citizen of the United States, and a resident of the city and county of Salem, State of New Jersey, have invented an Improvement in Glass-Molding Machines, of which the following is a specification.

My invention relates to a new and useful improvement in glass molding machines, and has for its object to provide simple and effective mechanism for molding and blowing bottles and the like, the insertion of the ordinary molding plunger in the initial process of molding being accomplished by compressed air acting upon a compound or double piston whereby a cushion pressure is exerted upon said plunger, and it is further intended that when the plunger has been forced to its lowest position, it may be raised and withdrawn by air pressure by simply reversing the air control valve.

A further object of my invention is to so arrange the blowing mechanism that its operations will be dependent upon the movements of the parts which operate the molding plunger, and in such manner that after the bottle is blown there will be a gradual escape of the air from the bottle, so as to avoid the tendency to collapse the completed bottle before it has cooled.

With these ends in view, this invention consists in the details of construction and combination of elements hereinafter set forth and more specifically designated by the claims.

In order that those skilled in the art to which this invention appertains may understand how to make and use the same, I will describe its construction in detail, reference being had to the accompanying drawings forming a part of this specification, in which—

In carrying out my invention as here embodied, it is to be understood that the parts here to be described are intended to work in connection with a machine having a turntable adapted to be revolved step by step for bringing molds successively beneath the molding and blowing apparatus, so that after the glass has been molded into a blank it may be transferred to the blow mold and have its body part blown to definite size and shape.

Figure 1:
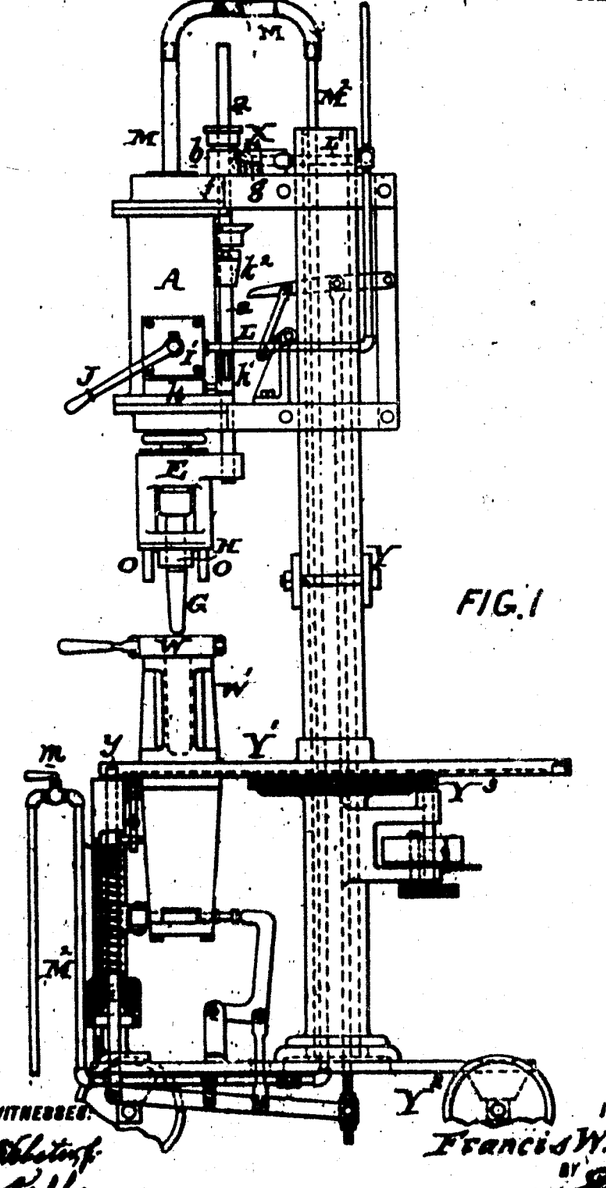
Figure 1 is an elevation of a glass molding machine embodying my invention.

The general construction of the machine is as shown in Fig. 1, in which Y is a column supported upon a truck $Y^2$ and provided with a mold carrying turn-table $Y^4$ which may be intermittently rotated by power devices $Y^3$ of any suitable construction. The turn-table carries the blank molds $W'$ and the blow molds $W^2$ and may be locked in various positions by latch $y$ of any convenient form. In practice, the blank molds and blow molds are arranged alternately and are respectively brought below the molding plunger G and the blow head P, so that when the glass is being blanked in the blank mold a previously made blank may be blown in the blow mold. The blank molding apparatus and the blow mold apparatus is preferably secured to the column Y at an angle of 90 degrees apart. The machine may be wheeled about the factory to be brought to working position close to the melting pot from which the glass, to be molded, is taken. The compressed air to operate the plunger and blow head may be conveyed to the machine by suitable hose or otherwise as found most convenient.

The initial molding operation consists in driving a tapered plunger into the molten glass contained in a blank mold W' from which the bottle or other article is to be made, and my improved mechanism for accomplishing this consists in the cylinder A provided with a piston B which is secured to the hollow piston rod C which passes through the stuffing box D, and has attached to its lower end a presser block E.

Figure 2:
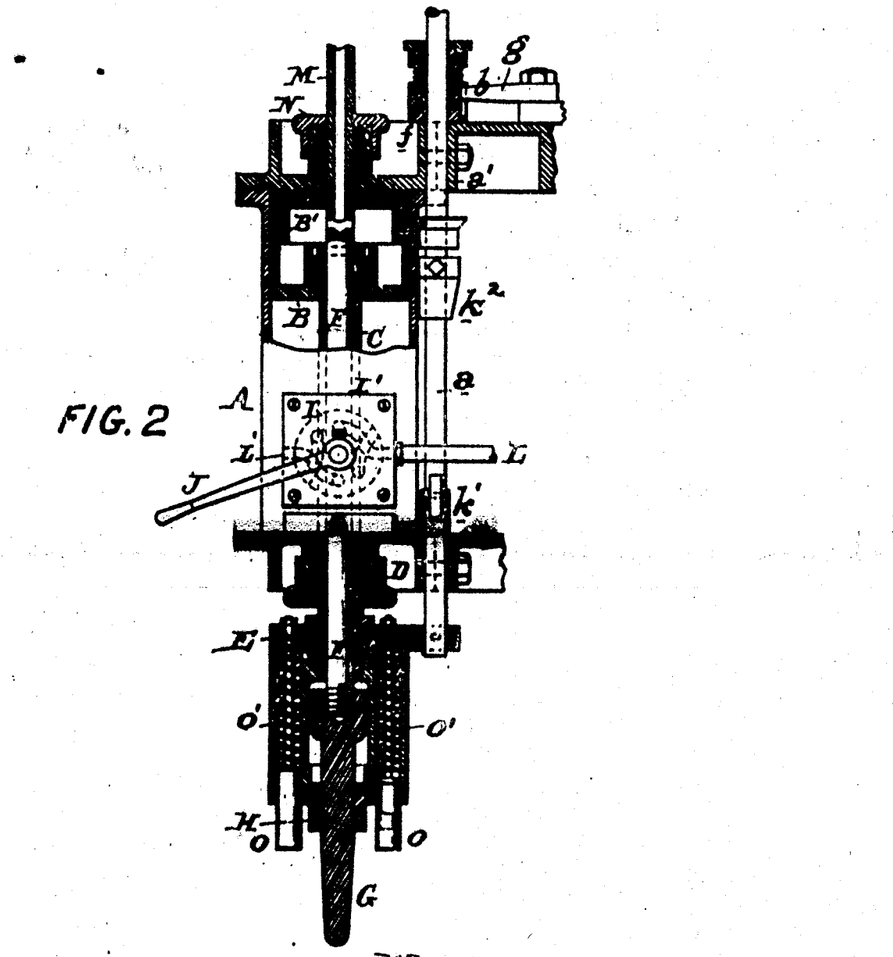
Fig. 2 is a side elevation with part in section of that portion of a glass molding machine embodying my invention which operates the molding plunger.

As shown in Fig. 2, a second piston B' is fitted to slide inside of the piston B and has secured to it the plunger rod F, the lower end of which carries the tapered plunger G, said plunger passing through the collar H carried by the presser block E.

I is a valve inclosed in a valve chest I' and adapted to be operated by the lever J and is so constructed relative to the ports K and K' of the cylinder that air admitted through the pipe L may be caused to flow either through the port K and thus reach the cylinder above the pistons or through the port K' to reach the cylinder below the pistons; and moreover, this valve is also so constructed that when the air is being admitted through one port it will be exhausting through the other port.

Figures 3, 4:
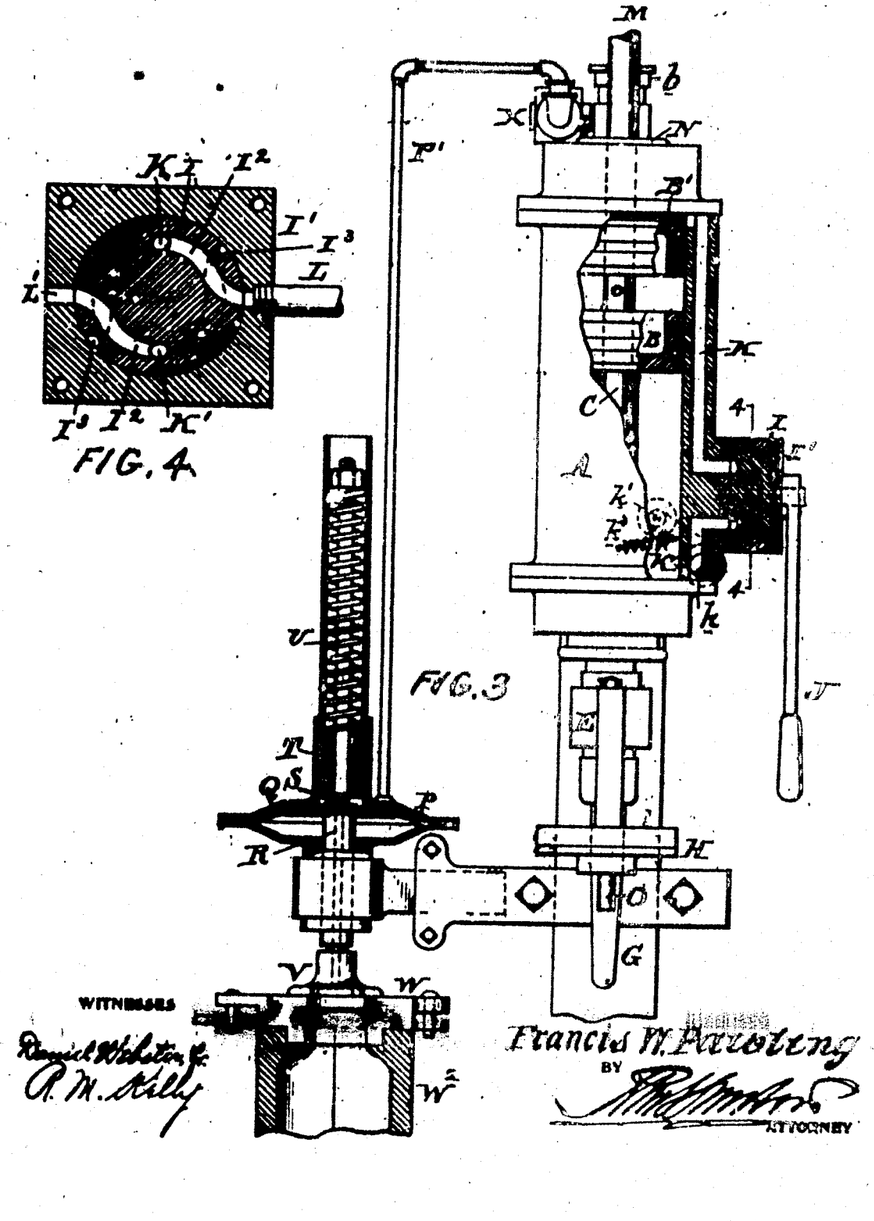
Fig. 3 is a front elevation of the parts shown in Fig. 2, with part in section, the double piston thereof being a slightly modified form of the double piston shown within the cylinder in Fig. 2.
Fig. 4 is a sectional elevation of the control valve on line 4—4 of Fig. 3.

The exhaust outlet in the valve chest is shown at L' in Fig. 4. The oscillating valve I has two ports I² which will respectively connect the air supply L with the port K and the exhaust outlet L' with the port K'. It also has two ports I³ which respectively connect the air supply L with the port K' and the exhaust outlet L' with the port K when the valve is shifted. It is evident therefore that the valve I may reverse the supply and exhaust with respect to the pistons to make them travel downward or upward, as desired.

In addition to the valve I, there is an auxiliary valve k which controls the port K' between the main valve I and the bottom of the cylinder A. This valve has a rocker arm k' carrying a roller and is rocked in one direction by the spring k² to open the valve and in the other direction by the cam k³ on the rod a to close the valve. The object of this construction is to automatically shut off the escape of air from below piston B just before completing its downward stroke so as to cushion it, and provide a force which, on the reversal of the valve I, will start the initial upward movement to again permit the valve k to open to freely admit compressed air from valve I to the cylinder to complete the upward stroke.

In practice, the valve k does not completely close, so that when the valve I is reversed the full pressure of the compressed air is not admitted to the cylinder below piston B until the piston B' has withdrawn the plunger G somewhat and the piston B started to rise, after which, the valve k opens fully and both pistons are forced up quickly.

M is a hollow piston rod and passes through the stuffing box N in the top of the cylinder A and is secured to the piston B' and to the plunger rod F also, if so desired. The interior of this hollow piston rod M leads to and opens into the space between the pistons B and B'. Compressed air is supplied to the upper end of this hollow piston rod M by a flexible pipe M' leading from a source of compressed air. When there is not sufficient force exerted upon the piston B' to overcome the air pressure between the pistons (which, in practice, is approximately fifteen pounds), these two pistons will remain in the relative position shown in Fig. 2; but when the plunger is to be driven into the glass to be molded, the admission of air through the port K above the pistons will drive both of said pistons B and B' down in unison until the spring actuated rods O of the presser block come in contact with the bead ring W seated upon the mold W', by which action these rods will be forced inward against the pressure of their springs O'. The collar H finally comes into contact with the bead ring W and arrests the downward movement of the piston B and thereafter the superior pressure of the air admitted to the cylinder by port K above the pistons will overcome the air pressure between the pistons, with the result of still further forcing downward the piston B' and driving the plunger G to its full depth in the glass and while the collar is firmly held by the action of the pressure between the pistons acting upon piston B. As before pointed out, the latter movement of the descending pistons causes the valve k to close and thereafter the compressed air below the pistons cushions them and the action of the collar upon the bead ring, but more particularly to prevent the inflow of air from the valve I at the initial return or upward movement for reasons to be now described.

The reversal of the valve I to exhaust the air from above the piston B' will cause the following operations: first, the air pressure between the pistons will force the piston B' upward and thereby withdraw the plunger from the glass before the collar H and presser block E have been raised from the bead ring W and the springs O' will raise the head E and cam rod a to open the valve k slightly; second, the compressed air is then admitted by valve k below the piston B and operates to move both pistons upward, and the collar will be raised clear of contact with the glass and bead ring W; and third, the valve k opens fully and admits full supply of compressed air to the cylinder below the pistons and they are forced upward together. When this upward movement has continued sufficiently to carry the spring actuated rods O out of contact with the bead ring, the molded glass may be then removed from the mold W' by lifting the bead ring W, and by means of said bead ring, it may be transferred to the blow mold.

The object of the spring actuated rods O is to exert sufficient pressure upon the bead ring W during the upward movement of the plunger G to hold said ring and the molded glass material carried thereby, in place, while the plunger G and collar H are being withdrawn therefrom, thus overcoming any tendency of the plunger and collar to stick in the glass, this tendency being largely due to the fact that there is a partial vacuum formed in the cavity of the glass by the first upward movement of the plunger. These spring actuated rods are important to the successful rapid operations of the machine. The springs further give an initial upward movement to the piston B and cam rod a though the necessity of the latter function may be overcome by allowing the valve I to permit slow inflow of compressed air when the valve is closed.

Figures 5, 6, 7, 8, 9:
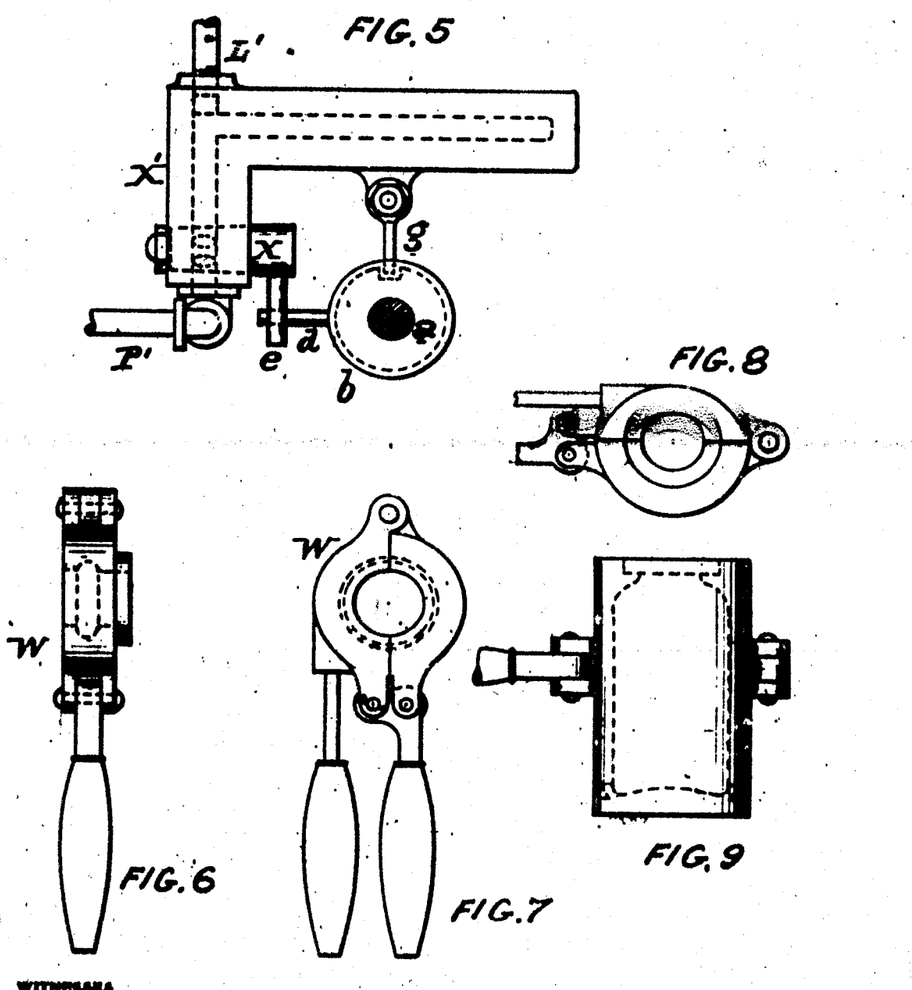
Fig. 5 is a plan view of a portion of the machine, showing the air supply to the blowing devices.
Figs. 6 and 7 are respectively side view and plan of a bead ring by which the glass being operated upon is transferred from the blank mold to the blow mold.
Figs. 8 and 9 are respectively plan and elevation views of the blow mold.

After the glass has been molded, it is transferred to the blow mold W² upon the top of which the bead ring W is placed, as shown in Fig. 5. When this has been done, my improved blowing apparatus will automatically force air into the cavity of the molded glass while still plastic and expand the glass into the shape of its surrounding mold. The construction of my improved blowing apparatus is as follows: P represents the blow head which consists of two concaved castings bolted together with a flexible diaphragm Q secured between them, and R is a plunger rod to which the diaphragm is secured, this plunger rod having a hole S formed therein above the diaphragm and leading downward through its center to the lower end. The upper portion of the plunger rod passes through a suitable stuffing box T and has a coil spring U arranged to normally force the rod together with the diaphragm, upward. The lower end of the plunger rod R has fitted thereon the swivel block V adapted to bear against the bead ring which already contains the finished mouth of the bottle to be blown.

In order that the blowing device may be automatically under control of the movements of the molding device, I provide a pipe P'' to supply compressed air to the head P above the diaphragm Q. Compressed air is supplied to the pipe P'' from the valve X, which latter is operated by a friction sleeve b carried by the rod a, which extends down to and is reciprocated by the presser block E. The rod a is guided in suitable bearings a' and slides through the friction sleeve b, after giving to it the required reciprocations. This friction sleeve has projecting therefrom the striker pin d adapted to operate the lever c of the valve X so as to turn the latter on or off, thereby regulating the supply of air to the blow head. The compressed air is supplied to the valve X through its body casting X' by pipe L' leading from the same source as supplies the pipe L to the main valve I.

In operation, when the piston B is moved down, carrying with it the presser block, the friction sleeve b will move down with rod a on account of its frictional contact therewith, and this down movement, as before described, will operate the valve X to admit air above the diaphragm Q of the blow head, thus forcing the plunger rod R downward and bringing the swivel block V in contact with the bead ring and the mouth of the bottle. When this has been accomplished, air will flow gradually through the hole S from the blow head into the bottle and expand the same to the shape of its surrounding mold. The blowing occurs when the pistons B, B' begin to move down and continues until the pistons start to move up on the return. Upon the reversal of the valve I to cause the presser block E to move up, the friction sleeve b will also be moved upward thereby closing the valve X; after which, the air within the bottle will gradually leak therefrom and also from above the diaphragm Q through the hole S, thus permitting the spring U to lift the swivel block V from off the mouth of the bottle, this action occurs when the pistons B, B' are moving upward. This completes the operations upon the bottle, and it is then only necessary to remove it from the mold in the usual manner.

It is to be noted that the friction sleeve b will be stopped in its downward movement by coming in contact with the frame f and in its upward movement by the bracket g projecting into a groove formed in the side of said sleeve. The object of this is to cause the valve X to open with the first downward movement of the rod a, and when said valve has been fully opened to permit said rod a to continue its downward movement without further affecting said valve; and also, upon the reverse or upward movement of said rod, that the valve will be first closed, while thereafter the rod will be permitted to continue its upward movement without further affecting said valve, as will be readily understood.

While there are many advantages derived from the use of my improvement, it is especially adapted for use in connection with the manufacture of high grade glassware, such as bottles for milk, since there is little or no tendency to exert too great pressure upon the glass at any time nor to expand it too rapidly, nor to collapse it by the sudden exhaustion of the air.

It is not necessary that the valve $k$ shall be fully closed when the pistons descend as it would suffice if, without cushioning, the supply of compressed air from port $K'$ was almost cut off so that it could not act upon the under side of the valve B quickly. This would let the pistons B, B' separate to raise the plunger G upon relieving the pressure from above piston B' and before the pressure accumulates below piston B.

I do not limit myself to the exact details of construction of my invention, as they may be varied without departing from the spirit of my invention, as for instance, the piston B' may be fitted to slide in the piston B, as shown in Fig. 2 or inverted, or they may both be fitted to separately slide in the cylinder, as shown in Fig. 3, the result in either case being the same.

Having thus fully described my invention, what I claim as new and useful is:—

1. In a glass blowing machine, the combination of an air cylinder, two pistons fitted therein and one having a limited independent movement relative to the other, a presser block arranged to be actuated by one of the pistons, a plunger arranged to be actuated by the other piston, means for maintaining air pressure between the two pistons, and means for admitting compressed air of a higher pressure above or below the pistons independently of the compressed air between the pistons.

2. In a glass blowing machine, the combination of an air cylinder, two pistons fitted therein and one having a limited independent movement relative to the other, a presser block arranged to be actuated by one of the pistons, a plunger arranged to be actuated by the other piston, means for maintaining air pressure between the two pistons, means for admitting compressed air of a higher pressure above or below the pistons independently of the compressed air between the pistons, a blow head, and means dependent upon the movements of the pistons for admitting air to the blow head.

3. In a machine of the character described, the combination of an air cylinder, two pistons located within said cylinders and one having a limited independent movement relative to the other, a hollow rod connected to one of the pistons, a presser block carried by the lower end of said hollow rod, a second rod passing through the hollow rod and connected to the other piston and carrying a plunger at its lower end, means supplying compressed air between the pistons for maintaining a given air pressure in the space between the two pistons, ports leading to the cylinder above and below the two pistons, and a valve for admitting air through said ports or exhausting it therefrom whereby said air acts independently of the compressed air between the pistons.

4. In a machine of the character described, the combination of an air cylinder, two pistons located within said cylinders, and one having a limited independent movement relative to the other, a hollow rod connected to one of the pistons, a presser block carried by the lower end of said hollow rod, a second rod passing through the hollow rod and connected to the other piston and carrying a plunger at its lower end, means supplying compressed air between the pistons for maintaining a given pressure in the space between the two pistons, ports leading to the cylinder above and below the two pistons, a valve for admitting air through said ports or exhausting it therefrom, whereby said air acts independently of the compressed air between the pistons, a rod attached to the presser block, a blow head, a pipe for conveying air to said blow head, a valve for controlling the flow of air through said pipe, means attached to the last named rod for actuating said valve at predetermined times relative to the movements of the pistons, and means for admitting air from the blow head to the article to be blown.

5. In a machine of the character described, the combination of an air cylinder, two pistons located within said cylinders and one having a limited independent movement relative to the other, a hollow rod connected to one of the pistons, a presser block carried by the lower end of said hollow rod, a second rod passing through the hollow rod and connected to the other piston and carrying a plunger at its lower end, means supplying compressed air between the pistons for maintaining a given pressure in the space between the two pistons, ports leading to the cylinder above and below the two pistons, a valve for admitting air through said ports or exhausting it therefrom, whereby said air acts independently of the compressed air between the pistons, a rod attached to the presser block, a blow head having a pneumatically actuated plunger terminating in means for delivering air to the mold, a pipe for conveying air to said blow head, a valve for controlling the flow of air through said pipe, means attached to the last named rod for actuating said valve at predetermined times relative to the movements of the pistons, and means for admitting air from the blow head to the article to be blown.

6. In a machine of the character described, the mold and bead ring combined with a reciprocating plunger, a reciprocating presser block surrounding the plunger and movable relatively to the plunger, and a spring actuated part fitted to slide in the presser block relatively to and extending below the presser block for holding the bead ring and work in place during the upward movement of the presser block and plunger.

7. In a glass molding and blowing machine, the combination of means for molding the glass preliminary to blowing it, with a blow mold, a blow head consisting of a head, a diaphragm, a hollow plunger secured to and moved by the diaphragm, a swivel head on the bottom of the plunger, a spring device for raising the plunger and diaphragm, a pipe to admit compressed air to the head above the diaphragm to depress it and to the hollow plunger for supplying the blow mold, and means for controlling the supply of compressed air to the blow head controlled by the means for molding the glass.

8. In a glass molding machine, the combination of a cylinder, a piston for the cylinder having a piston rod, a plunger on the end of the piston rod, a blank mold for receiving the plunger, a bead ring adapted to the mold, a hollow piston rod surrounding the first mentioned piston rod having means for pressing upon the bead ring and mold, means within the cylinder and secured to the upper end of the hollow piston rod for giving it a normally relative yielding pressure independent of the operating pressure of the first mentioned piston whereby it may hold down the bead ring and mold when the plunger is being entered and withdrawn, and means for admitting an operating fluid pressure alternately above and below the piston.

9. In a glass molding machine, the combination of a cylinder, a piston for the cylinder having a piston rod, a plunger on the end of the piston rod, a blank mold for receiving the plunger, a bead ring adapted to the mold, a hollow piston rod surrounding the first mentioned piston rod having means for pressing upon the bead ring and mold, means within the cylinder and secured to the upper end of the hollow piston rod for giving it a normally relative yielding pressure whereby it may hold down the bead ring and mold when the plunger is being entered and withdrawn, means for admitting an operating fluid pressure alternately above and below the piston, and means for cushioning the hollow piston rod just before completing its downward movement.

10. In a glass molding machine, the combination of a mold, a bead ring for the mold, a cylinder, two piston rods, a piston on the end of each piston rod forming a chamber between them, means for creating a pressure between the pistons, a plunger secured to one of the piston rods and working in the mold, means on the end of the other piston rod for holding down the bead ring and mold, and means for admitting a pressure fluid to either end of the cylinder.

11. In a glass molding machine, the combination of a mold, a bead ring for the mold, a cylinder, two piston rods, a piston on the end of each piston rod forming a chamber between them, means for creating a pressure between the pistons consisting of a compressed air passage extending into the space between the pistons, a plunger secured to one of the piston rods and working in the mold, means on the end of the other piston rod for holding down the bead ring and mold, and means for admitting compressed air to either end of the cylinder.

12. In a glass molding machine, the combination of a mold, a bead ring for the mold, a cylinder, two piston rods, a piston on the end of each piston rod forming a chamber between them, means for creating a pressure between the pistons, a plunger secured to one of the piston rods and working in the mold, means on the end of the other piston rod for holding down the bead ring and mold, means for admitting a pressure fluid to either end of the cylinder, and means for cushioning the lowermost piston before it completes its downward movement in applying pressure upon the bead ring and to give an initial upward movement in reversing.

13. In a glass molding machine, the combination of a mold, a bead ring for the mold, a cylinder, two piston rods, a piston on the end of each piston rod forming a chamber between them, means for creating a pressure between the pistons, a plunger secured to one of the piston rods and working in the mold, means on the end of the other piston rod for holding down the bead ring and mold, and means for admitting a pressure fluid to either end of the cylinder, and means for cushioning the lower piston before it reaches the bottom of the cylinder.

14. In a glass molding machine, the combination of a cylinder, a valve chest having ports leading respectively to the top and bottom of the cylinder, piston devices within the cylinder for operating the plunger and presser block of the machine, a valve for admitting a pressure fluid to one port and exhausting it from the other and vice versa, and an auxiliary valve to control the port leading to the bottom of the cylinder for causing a restriction of the port when the pistons are at the limit of their downward travel.

15. In a glass molding machine, the combination of a cylinder, a valve chest having ports leading respectively to the top and bottom of the cylinder, piston devices within the cylinder for operating the plunger and presser block of the machine, a valve for admitting a pressure fluid to one port and exhausting it from the other and vice versa, and an auxiliary valve to control the port leading to the bottom of the cylinder for causing a restriction of the port when the pistons are at the limit of their downward travel, a spring to open said auxiliary valve, a rod movable by the piston devices, and a cam on the rod for closing the auxiliary valves.

16. In a glass molding machine, the combination of a cylinder, a valve chest having ports leading respectively to the top and bottom of the cylinder, piston devices within the cylinder for operating the plunger and presser block of the machine, a valve for admitting a pressure fluid to one port and exhausting it from the other and vice versa, and an auxiliary valve to control the port leading to the bottom of the cylinder for causing a restriction of the port when the pistons are at the limit of their downward travel, a spring to open said auxiliary valve, a rod movable by the piston devices, and a cam on the rod for closing the auxiliary valves, a blow head, a valve to control admission of compressed air to the blow head, and a friction collar on the rod for automatically opening and closing the valve so as to time the admission of compressed air with the movement of the piston devices.

17. In a machine of the character described, means for molding a glass blank, combined with means for blowing the glass blank, having a pneumatically operated blow head, and connecting means for causing the means for blowing the glass to be put into operation and maintained in operation during the operation of the means for molding the glass blank when in its molding operation.

18. In a machine of the character described, means for molding a glass blank, combined with means for blowing the glass blank having a pneumatically operated blow head, and connecting means for causing the means for blowing the glass to be put into operation and maintained in operation during the operation of the means for molding the glass blank when in its molding operation, a rotating table for conveying the molds from the means for molding the glass blank to the means for blowing the glass blank, and locking means for holding the table in its adjusted positions during the molding and blowing operations.

19. In a glass blowing machine, the combination of an air cylinder, two pistons fitted therein and one having a limited independent movement relative to the other, a presser block arranged to be actuated by one of the pistons, a plunger arranged to be operated by the other piston, means for admitting compressed air to the upper and lower ends of the cylinder, means for admitting compressed air to the space between the pistons at a pressure lower than that admitted to the cylinder, and valve devices for retarding the admission of compressed air to the bottom of the cylinder until the lower piston has risen slightly at the beginning of its upward movement.

20. In a glass blowing machine, the combination of an air cylinder, two pistons fitted therein and one having a limited independent movement relative to the other, a presser block arranged to be actuated by one of the pistons, a plunger arranged to be operated by the other piston, a main valve for controlling the admission of compressed air to the top and bottom of the cylinder, means for admitting compressed air to the space between the pistons at a pressure lower than that admitted to the cylinder, and valve devices for retarding the admission of compressed air to the bottom of the cylinder until the lower piston has risen slightly at the beginning of its upward movement consisting of an auxiliary valve to control the compressed air admitted to the bottom of the cylinder by the main valve, and connecting means for operating the auxiliary valve controlled by the movement of the lower pistons.

21. In a glass blowing machine, the combination of an air cylinder, two pistons fitted therein and one having a limited independent movement relative to the other, a presser block arranged to be actuated by one of the pistons, a plunger arranged to be operated by the other piston, a main valve for controlling the admission of compressed air to the top and bottom of the cylinder, means for admitting compressed air to the space between the pistons at a pressure lower than that admitted to the cylinder, and valve devices for retarding the admission of compressed air to the bottom of the cylinder until the lower piston has risen slightly at the beginning of its upward movement consisting of an auxiliary valve to control the compressed air admitted to the bottom of the cylinder by the main valve, and connecting means for operating the auxiliary valve controlled by the movement of the lower pistons, said connecting means comprising a vertically movable rod $a$ provided with a cam $k^2$, and a spring actuated arm moved by the cam in one direction and by the spring in the other direction for operating the auxiliary valve.

22. In a machine of the character described, the mold and a ring arranged above the mold, combined with a reciprocating plunger adapted to enter the mold, a reciprocating presser block having at its lower part a molding collar surrounding the plunger and said presser block and its collar being relatively movable with respect to the plunger, and spring actuated means yieldingly carried by the presser block to press upon and hold the ring and work in place during the upward movement of the presser block.

23. In a machine of the character described, a plunger and presser block movable together and connected with provision for relative longitudinal movement with respect to each other and in which the lower part of the presser block surrounds the molding part of the plunger, combined with spring devices carried by the presser block and projecting below the same.

In testimony of which invention, I have hereunto set my hand.

FRANCIS W. PAWLING.

Witnesses:
R. M. HUNTER,
R. M. KELLY.